(12) United States Patent
Zhu et al.

(10) Patent No.: US 10,816,753 B2
(45) Date of Patent: Oct. 27, 2020

(54) LENS DRIVING APPARATUS (71) Applicant: AAC Technologies Pte. Ltd., Singapore (SG)

(72) Inventors: Bingke Zhu, Shenzhen (CN); Kaiyan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 186 days.

(21) Appl. No.: 16/236,501

(22) Filed: Dec. 30, 2018

(65) Prior Publication Data
US 2019/0302397 A1    Oct. 3, 2019

(30) Foreign Application Priority Data

Mar. 27, 2018   (CN) .......................... 2018 1 0259209

(51) Int. Cl.
  G02B 7/02    (2006.01)
  G02B 7/09    (2006.01)
  F03G 7/06    (2006.01)
  H02N 10/00   (2006.01)
(52) U.S. Cl.
  CPC ............... *G02B 7/09* (2013.01); *F03G 7/065* (2013.01); *H02N 10/00* (2013.01)

(58) Field of Classification Search
  CPC .......... G02B 7/003–005; G02B 7/0023; G02B 7/04; G02B 7/026; G02B 7/08; G02B 7/09; F03G 7/065
  See application file for complete search history.

(56) References Cited

U.S. PATENT DOCUMENTS

2017/0285443 A1* 10/2017 Hu .......................... G03B 5/04

* cited by examiner

*Primary Examiner* — Alicia M Harrington
(74) *Attorney, Agent, or Firm* — IPro, PLLC; Na Xu (57) ABSTRACT

The present disclosure provides a lens driving apparatus comprising: a base comprising insulated first and second conductive terminals; a supporting frame provided with third conductive terminal electrically connected to second conductive terminal; a barrel comprising insulated first and second conductive wires; and elastic members made of memory alloys and comprising first and second elastic members. The first elastic member has one end fixed to supporting frame and electrically connected to third conductive terminal and another end fixed to barrel and electrically connected to first conductive wire to form current loop for driving barrel to move in positive or negative direction of optical axis. The second elastic member has one end fixed to base and electrically connected to first conductive terminal, and another end fixed to barrel and electrically connected to second conductive wire to form current loop for driving barrel to move in negative or positive direction of optical axis.

12 Claims, 12 Drawing Sheets

LENS DRIVING APPARATUS

CROSS-REFERENCE TO RELATED APPLICATIONS

The present application claims priority to Chinese Patent Application 201810259209.8, filed on Mar. 27, 2018, the content of which is incorporated herein by reference in its entirety.

TECHNICAL FIELD

The present disclosure relates to a driving apparatus, and more particularly to a lens driving apparatus.

BACKGROUND

With the development of photographic technology, lens driving apparatuses have been widely applied in various photographic devices. Combinations of lens driving apparatuses with various portable electronic devices such as mobile phones, cameras and computers are get favored by consumers.

In the related art, a driver in a lens driving apparatus is typically a driving structure formed by a coil and a magnet. The coil and the magnet are fixed on a barrel and a housing, respectively and the barrel is supported by the housing via an elastic sheet. When a current is applied to the coil, the coil and the magnet generate an electromagnetic field. The coil, subject to an electromagnetic force, drives the magnet to move along a straight line, which in turn causes the barrel to move in a direction of an optical axis.

However, in the related art, the barrel moves subject to the electromagnetic force, which is vulnerable to interference of a magnetic field. An additional Hall element is required to detect shaking of the barrel. It may have a low reliability in some special circumstances.

There is thus a need for an improved lens driving apparatus to solve the above problem.

BRIEF DESCRIPTION OF DRAWINGS

In order to explain the solutions according to the embodiments of the present disclosure more clearly, the figures used in the description of the embodiments will be introduced briefly below. Obviously, the following figures only illustrate some of the embodiments of the present disclosure. Other figures can be obtained by those having ordinary skill in the art from these figures without any inventive efforts. In the figures.

DESCRIPTION OF EMBODIMENTS

In the following, the solutions according to the embodiments of the present disclosure will be described clearly and fully with reference to the figures. Obviously, the embodiments described below are only some, rather than all, of the embodiments of the present disclosure. All other embodiments that can be obtained by those skilled in the art from the embodiments described below without any inventive efforts are to be encompassed by the scope of the present disclosure.

First Embodiment

Figure 1:
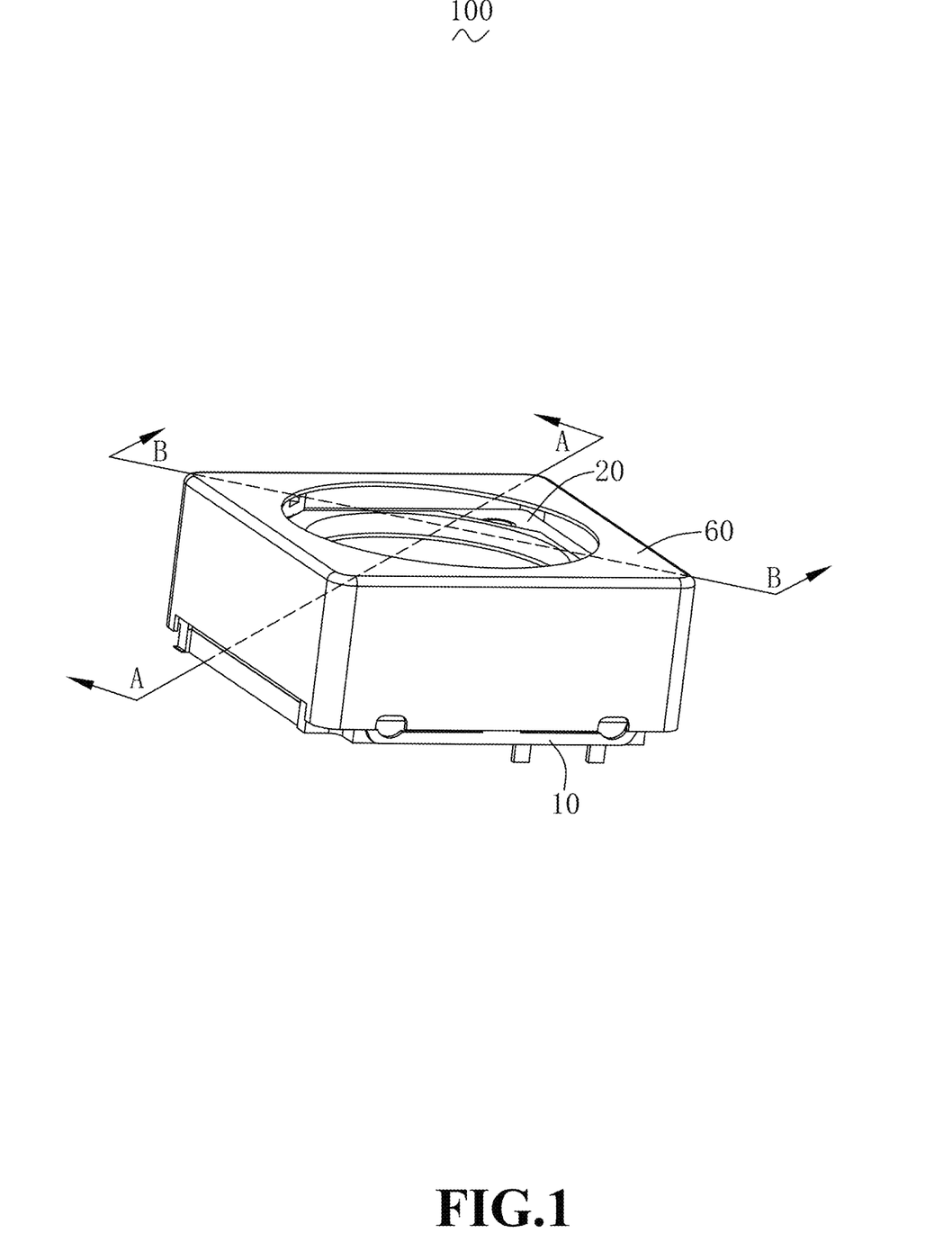
FIG. 1 is a perspective structural schematic diagram of a lens driving apparatus of the present disclosure.
Figure 2:
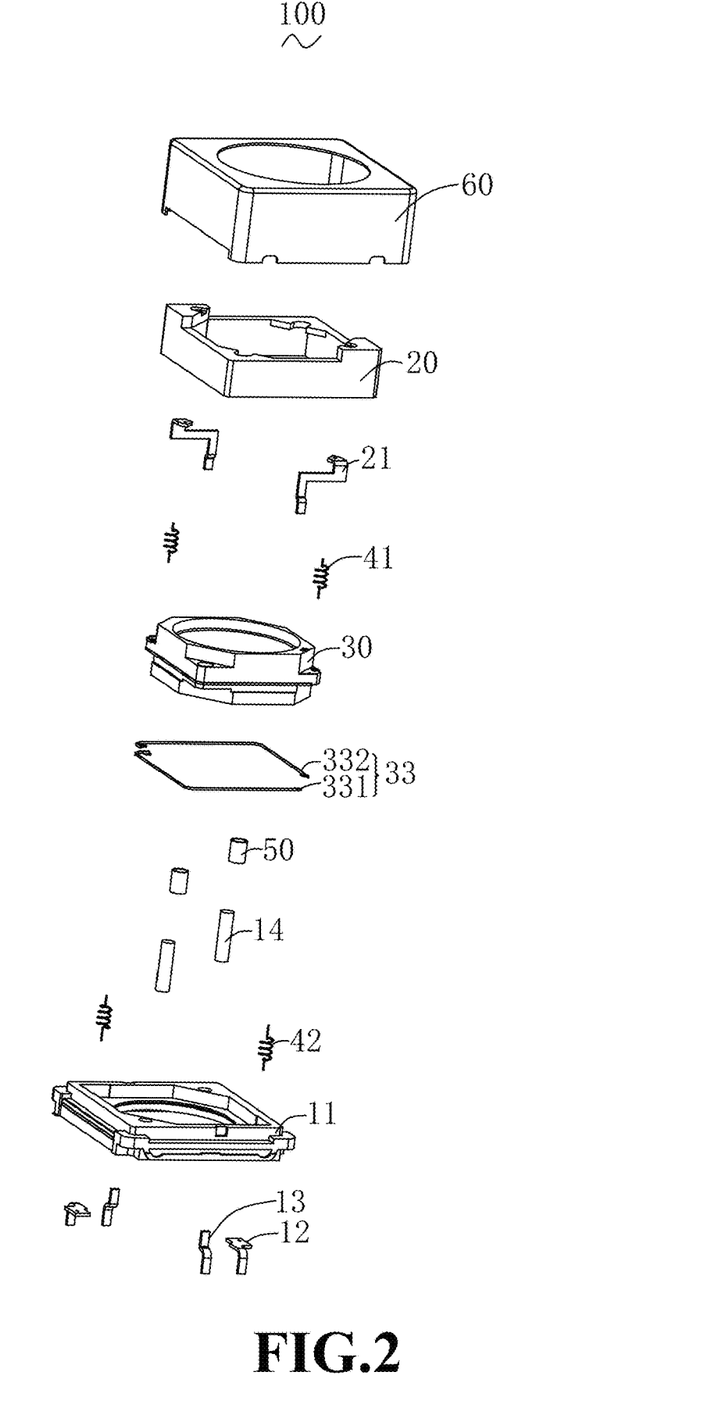
FIG. 2 is an exploded structural schematic diagram of the lens driving apparatus of the present disclosure.

Referring to FIG. 1 and FIG. 2, the present disclosure provides a lens driving apparatus 100. The lens driving apparatus 100 includes a base 10, a supporting frame 20 that covers and fits the base 10 and encloses an accommodating space together with the base 10, a barrel 30 accommodated in the accommodating space, an elastic member 40 by which the barrel 30 is supported in the air within the accommodating space, a metal sleeve 50 fixed to the barrel 30, and a housing 60 covering the base 10.

Figure 3:
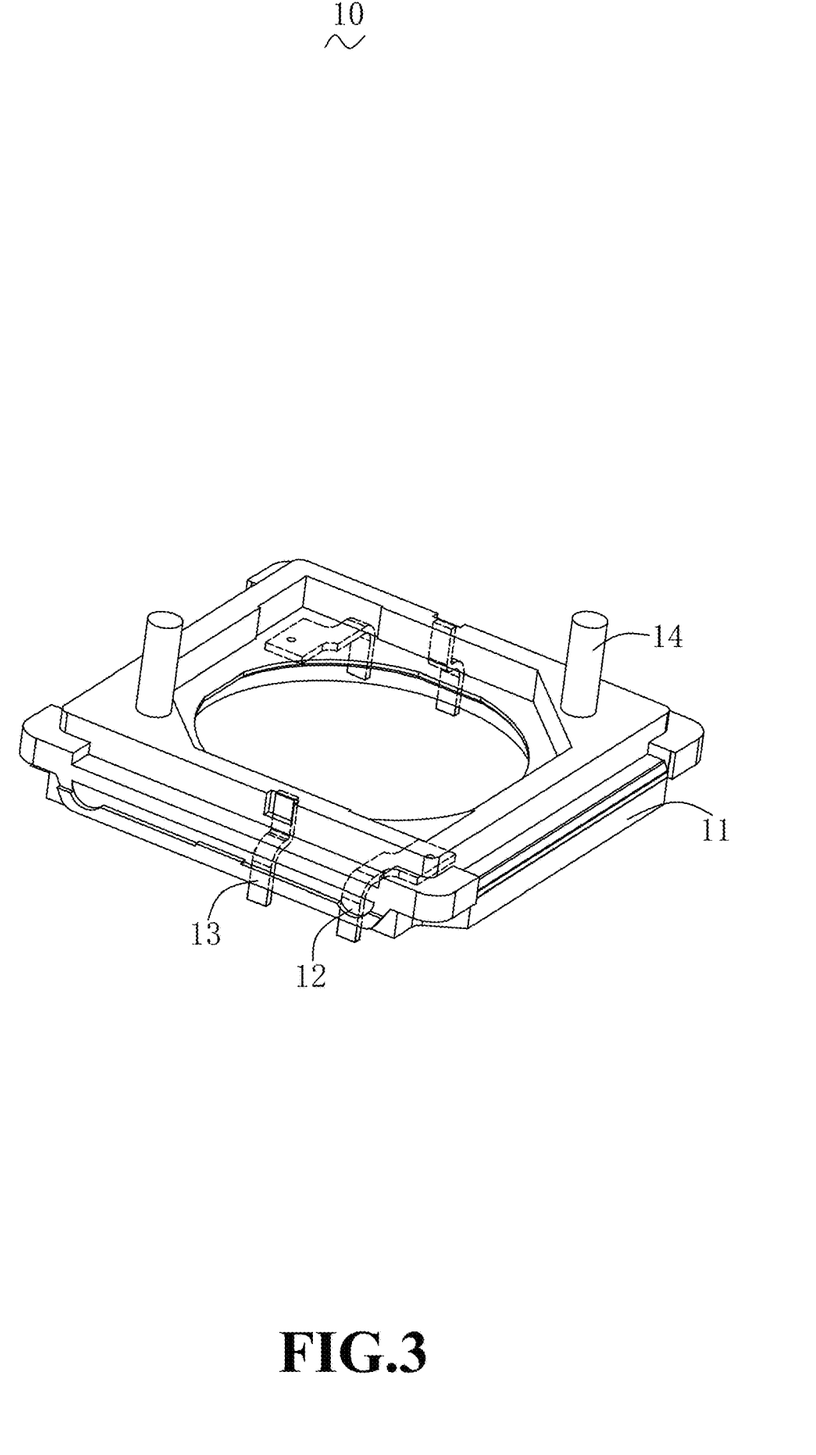
FIG. 3 is a perspective structural schematic diagram of a base of the present disclosure viewed from one angle.
Figure 4:
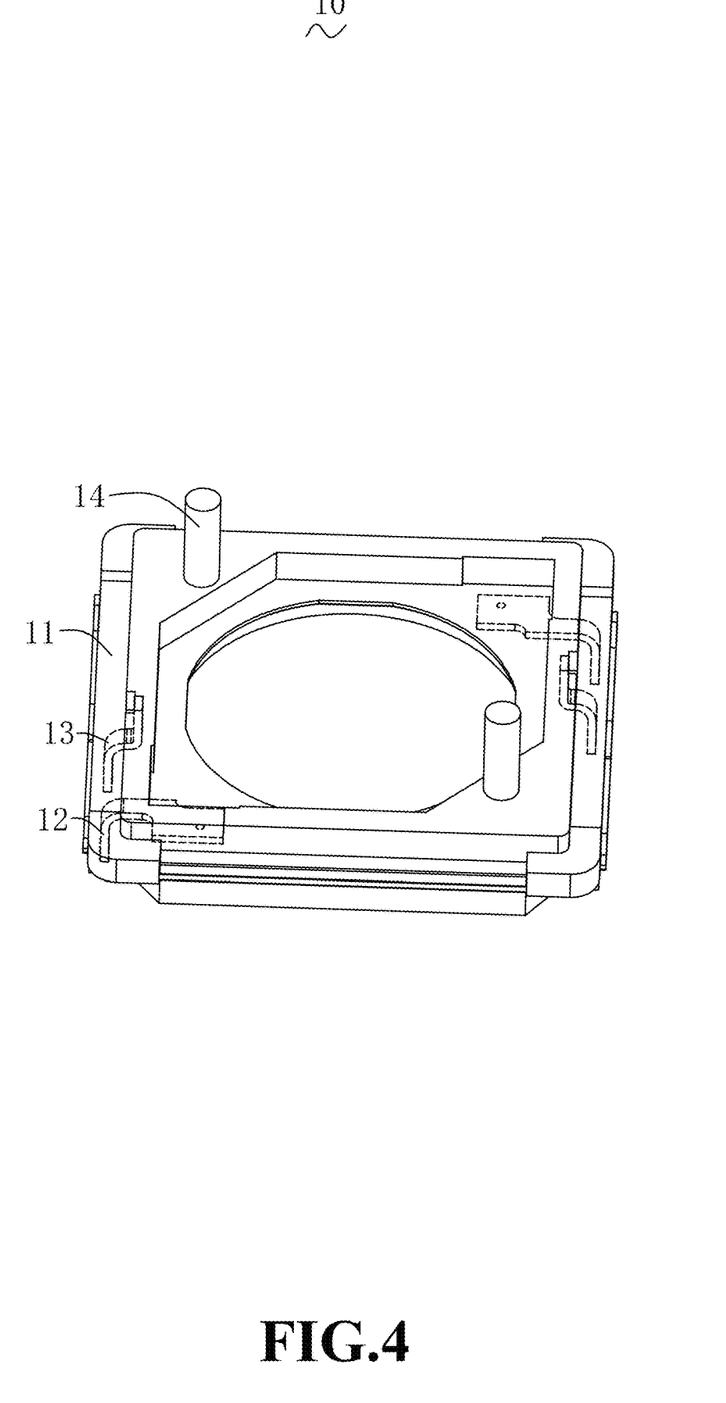
FIG. 4 is a perspective structural schematic diagram of a base of the present disclosure viewed from another angle.

Referring to FIG. 3 and FIG. 4, the base 10 includes a pedestal 11, a first conductive terminal 12 and a second conductive terminal 13 disposed on the pedestal 11 and insulated from each other, and a guiding pole 14 fixed on the pedestal 11.

The first conductive terminal 12 and the second conductive terminal 13 are used for electrical connection with the outside.

Specifically, two first conductive terminals 12 are provided and distributed on two opposite sides of the pedestal 11, and two second conductive terminals 13 are provided and disposed to be corresponding to and spaced apart from the first conductive terminals 12.

The guiding pole 14 and the pedestal 11 are formed in one piece by means of injection molding. The guiding pole 14 and the pedestal 11 can also be fixed together by glue.

Figure 5:
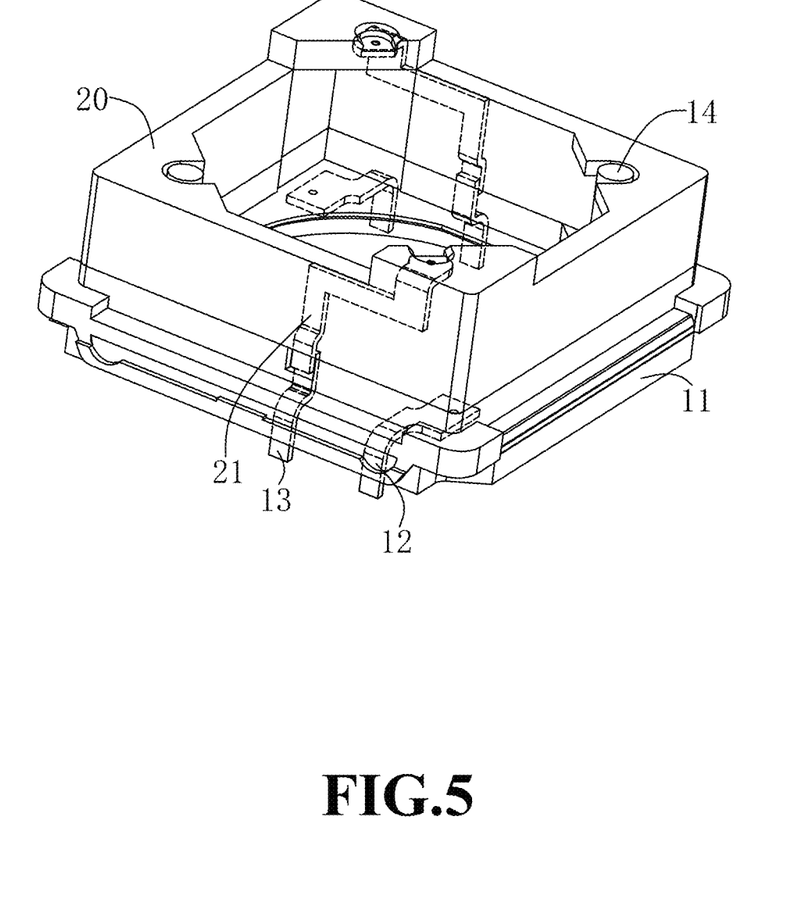
FIG. 5 is a schematic diagram showing a mating structure of a base and a supporting frame of the present disclosure viewed from one angle.
Figure 6:
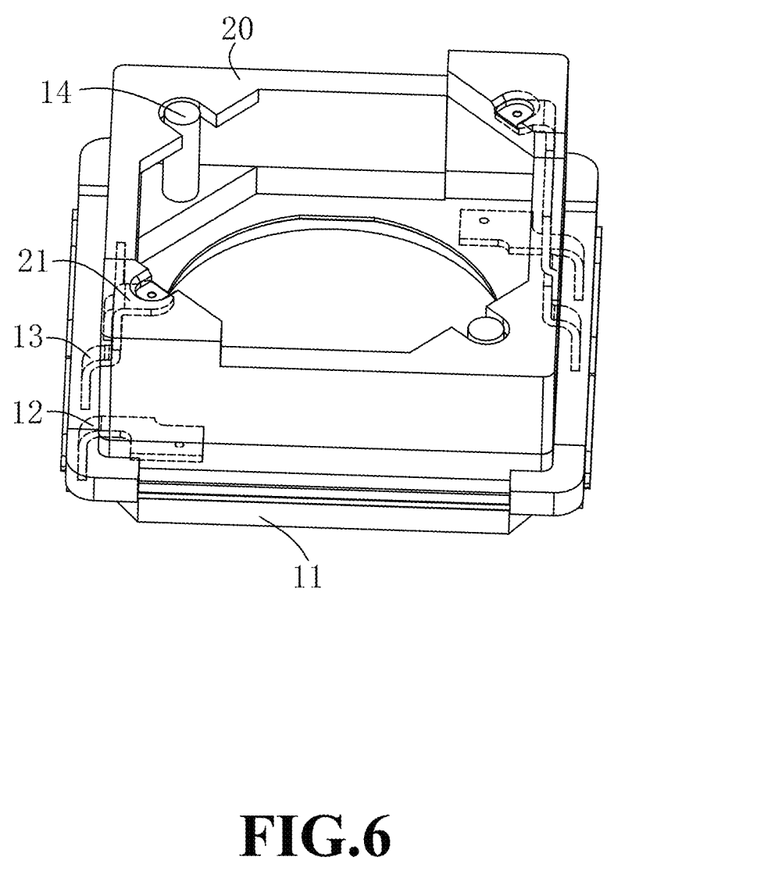
FIG. 6 is a schematic diagram showing the mating structure of a base and a supporting frame of the present disclosure viewed from another angle.

Referring to FIG. 5 and FIG. 6, the supporting frame 20 is provided with a third conductive terminal 21 electrically connected to the second conductive terminal 13.

Specifically, two third conductive terminals 21 are provided, and the two third conductive terminals 21 are respectively connected to the two second conductive terminals 13.

The barrel 30 has an annular shape.

Figure 7:
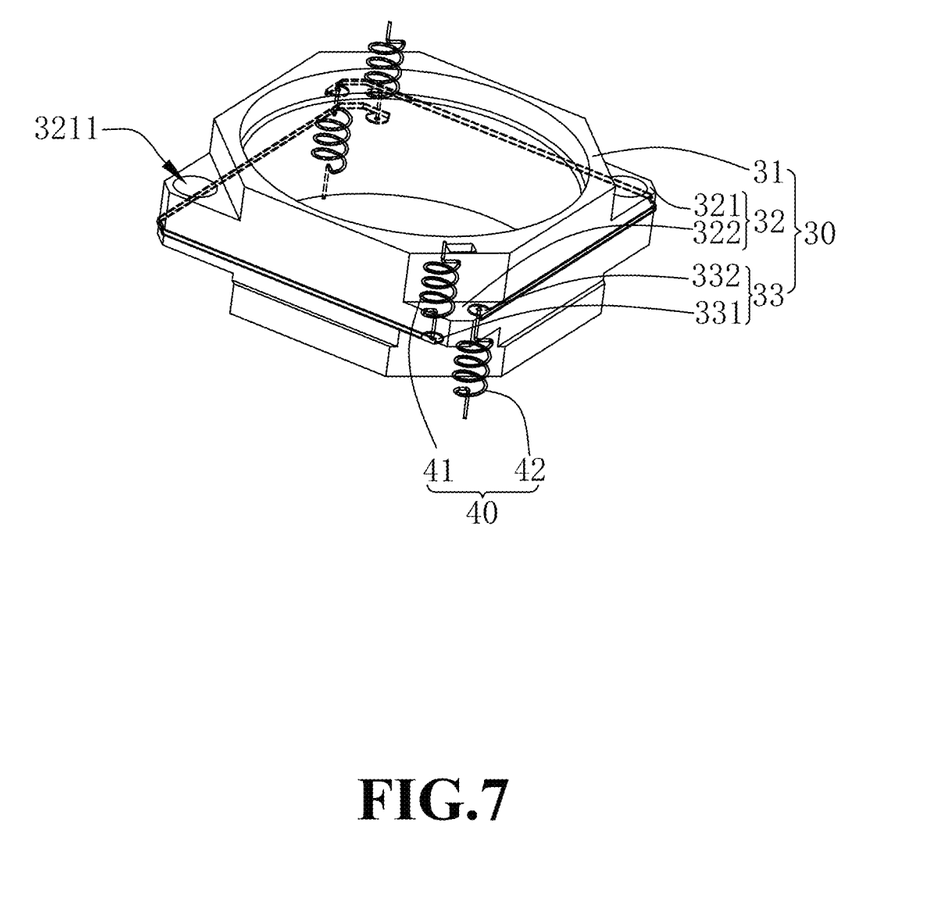
FIG. 7 is a schematic diagram showing a mating structure of a barrel and an elastic member of the present disclosure.

In conjunction with FIG. 7, the barrel 30 includes a barrel body portion 31, and a barrel extending portion 32 extending from the barrel body portion 31 in a direction away from an optical axis.

The barrel extending portion 32 can be distributed on a circumference of the barrel body portion 31 in an annular array.

In the present embodiment, four barrel extending portions 32 are disposed at equal intervals around the barrel body portion 31. Of course, more barrel extending portions 32 can be arranged, which is not limited thereto in the present disclosure.

The barrel extending portions 32 include two first extending portions 321 and two second extending portions 322.

The two first extending portions 321 are symmetrically disposed about the optical axis, and the two second extending portions 322 are symmetrically disposed about the optical axis.

In the present embodiment, specifically, an outer wall of the barrel 30 forms a rectangular ring shape. The two first extending portions 321 are distributed in one diagonal line and the two second extending portions 322 are distributed in the other diagonal line. Of course, the outer wall of the barrel 30 can also forms an annular shape or any other shape.

The two first extending portions 321 are respectively provided with a guiding hole 3211 penetrating therethrough in a direction parallel to the optical axis.

The guiding pole 14 is installed into the guiding hole 3211 and an axis of the guiding pole 14 is parallel to the optical axis. The guiding pole 14 is used to guide the barrel 30 in such a manner that the barrel 30 moves relative to the pedestal 11 in the direction parallel to the optical axis, thereby avoiding deviation of the barrel 30 when it is moving.

An outer surface of the barrel 30 on a side away from the optical axis is provided with a conductive wire 33 by means of Laser Direct Structuring (LDS).

The conductive wire 33 includes a first conductive wire 331 and a second conductive wire 332 that are insulated from each other.

The first conductive wire 331 has two ends respectively fixed to the two second extending portions 322 and located on a side close to the pedestal 11.

The second conductive wire 332 has two ends respectively fixed to the two second extending portions 322 and located on a side away from the pedestal 11.

The two conductive wires 33 are both processed by means of Laser Direct Structuring (LDS) and are formed into one piece together with the barrel 30, such that the conductive wire 33 does not add to the thickness of the barrel 30 in the optical axis direction. In this way, the lens driving apparatus 100 can be made thinner, which facilitates the miniaturization of the product. Further, the LDS process can be applied in batch processing.

The elastic member 40 is made of memory alloys.

For example, the elastic member 40 can be a coil spring.

The elastic member 40 includes a first elastic member 41 and a second elastic member 42.

In the present embodiment, specifically, the first elastic member 41 and the second elastic member 42 are both unidirectional compression springs capable of compressing under heat, that is, the first elastic member 41 and the second elastic member 42 will contract when being heated.

Figure 8:
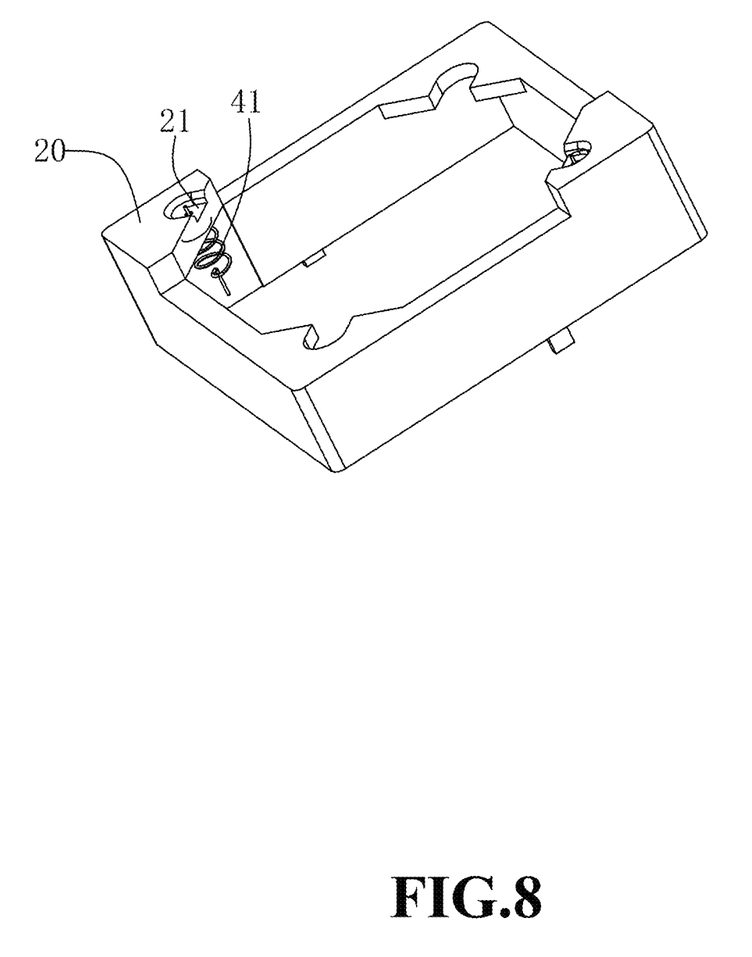
FIG. 8 is a schematic diagram showing a mating structure of a supporting frame and an elastic member of the present disclosure viewed from one angle.
Figure 9:
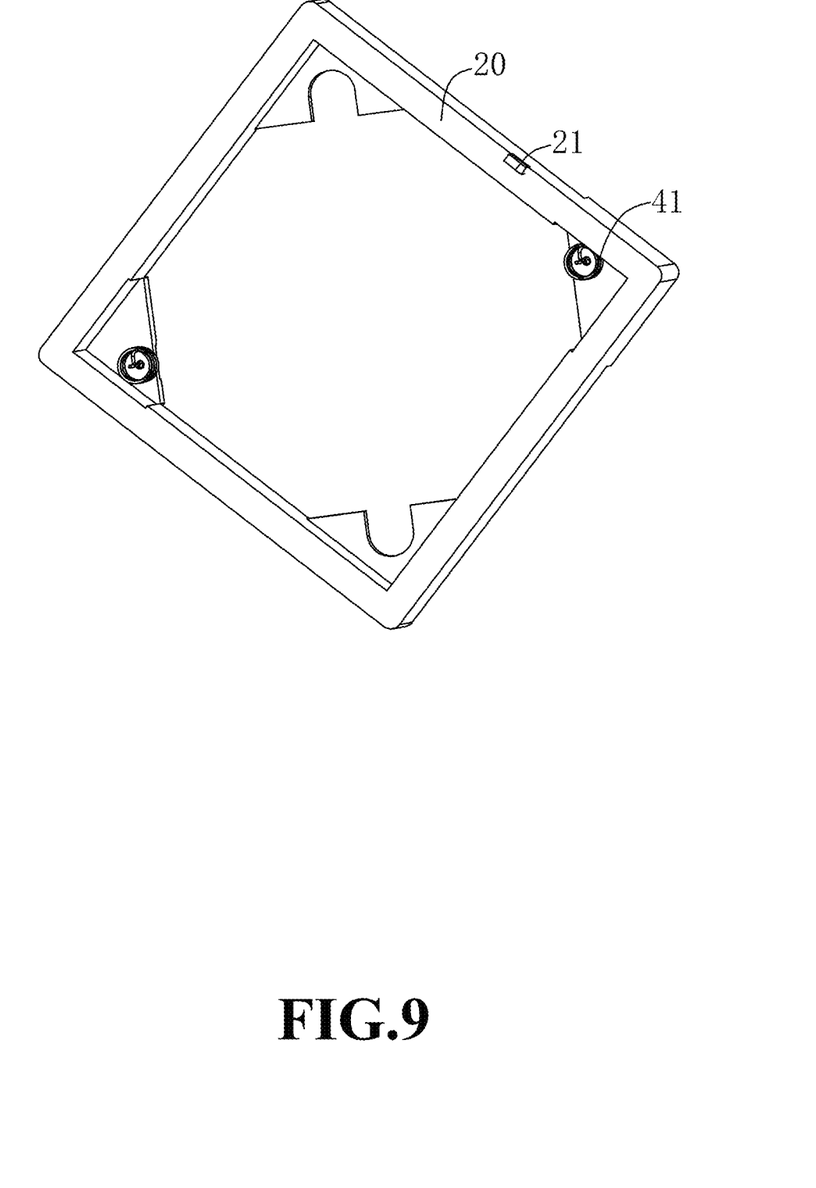
FIG. 9 is a schematic diagram showing the mating structure of a supporting frame and an elastic member of the present disclosure viewed from another angle.

Referring to FIGS. 7-9, the first elastic member 41 has one end fixed to the supporting frame 20 and the other end fixed to the barrel 30.

Specifically, the first elastic member 41 has one end electrically connected to the third conductive terminal 21, and the other end connected to the second extending portion 322.

More specifically, the other end of the first elastic member 41 is electrically connected to the first conductive wire 331 on the second extending portion 322, and the first elastic member 41 is located on the side of the second extending portion 322 away from the pedestal 11. That is, the first elastic member 41 passes through the second extending portion 322 to be electrically connected to the first conductive wire 331.

Two first elastic members 41 are provided to be respectively connected to two ends of the first conductive wire 331.

The first elastic member 41, the first conductive wire 331, the third conductive terminal 21 and the second conductive terminal 13 together form a current loop.

Since the first elastic member 41 is made of memory alloys, by applying currents to the second conductive terminal 13, the crystal structure of the first elastic member 41 is converted from martensite to austenite due to the thermal effect, such that the first elastic member 41 starts to contract. When the currents decrease or stop, the temperature of the first elastic member 41 decreases, and the first elastic member 41 extends and reverts to its initial state. In this way, the barrel 30 can be controlled by the first elastic member 41 to move in a positive direction of the direction of the optical axis, and the positive direction movement is moving away from the pedestal 11. At the same time, since the shape memory alloys exhibit different resistances at different temperatures, a closed-loop control can be applied based on this characteristic. When the current is different, the temperature, position, and resistance also change, so the resistance can be matched with the position.

Figure 10:
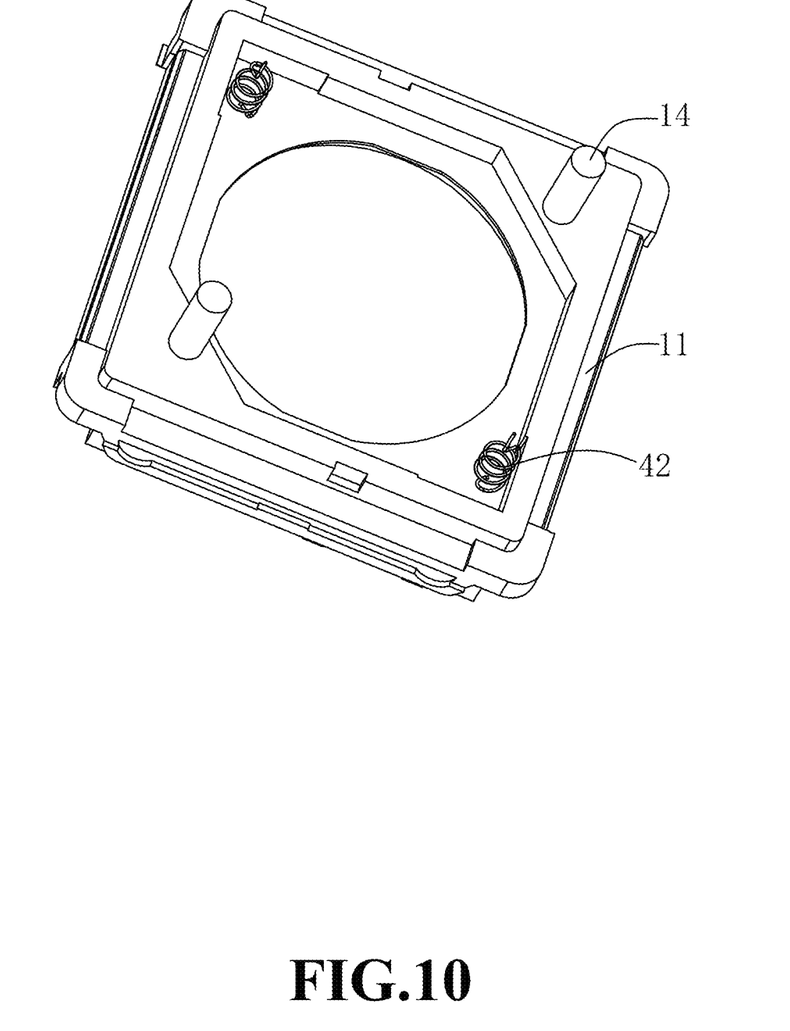
FIG. 10 is a schematic diagram showing a mating structure of the base and the elastic member of the present disclosure.

Referring to FIG. 7 and FIG. 10 in combination, the second elastic member 42 has one end fixed to the pedestal 11 and the other end fixed to the barrel 30.

Specifically, the second elastic member 42 has one end electrically connected to the first conductive terminal 12, and the other end connected to the second extending portion 322.

More specifically, the other end of the second elastic member 42 is electrically connected to the second conductive wire 332 on the second extending portion 322, and the second elastic member 42 is located on the side of the second extending portion 322 close to the pedestal 11. That is, the second elastic member 42 passes through the second extending portion 322 to be electrically connected to the second conductive wire 332.

Two second elastic members 42 are provided and respectively connected to two ends of the second conductive wire 332.

The second elastic member 42, the second conductive wire 332, and the first conductive terminal 12 together form a current loop.

Since the second elastic member 42 is made of memory alloys, by applying currents to the first conductive terminal 12, the crystal structure of the second elastic member 42 is converted from martensite to austenite due to the thermal effect, such that the second elastic member 42 starts to contract. When the currents decrease or stop, the temperature of the second elastic member 42 decreases, and the second elastic member 42 extends and reverts to its initial state. In this way, the barrel 30 can be controlled by the second elastic member 42 to move in a negative direction of the direction of the optical axis, and the negative direction movement is moving towards the pedestal 11. At the same time, since the shape memory alloys exhibit different resistances at different temperatures, a closed-loop control can be applied based on this characteristic. When the current is different, the temperature, position, and resistance also change, so the resistance can be matched with the position.

Figure 11:
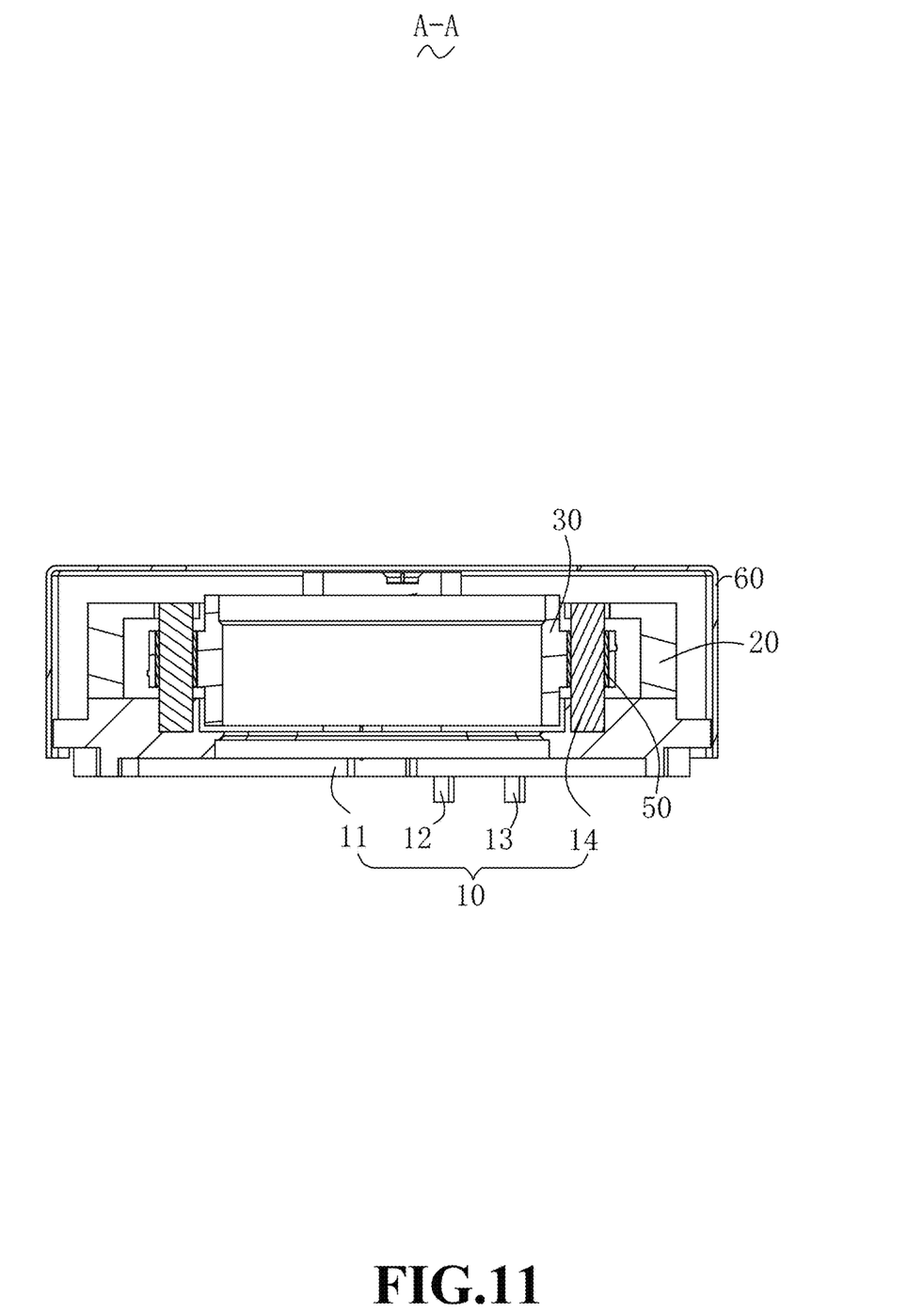
FIG. 11 is a cross-sectional diagram taken along line A-A of FIG. 1.
Figure 12:
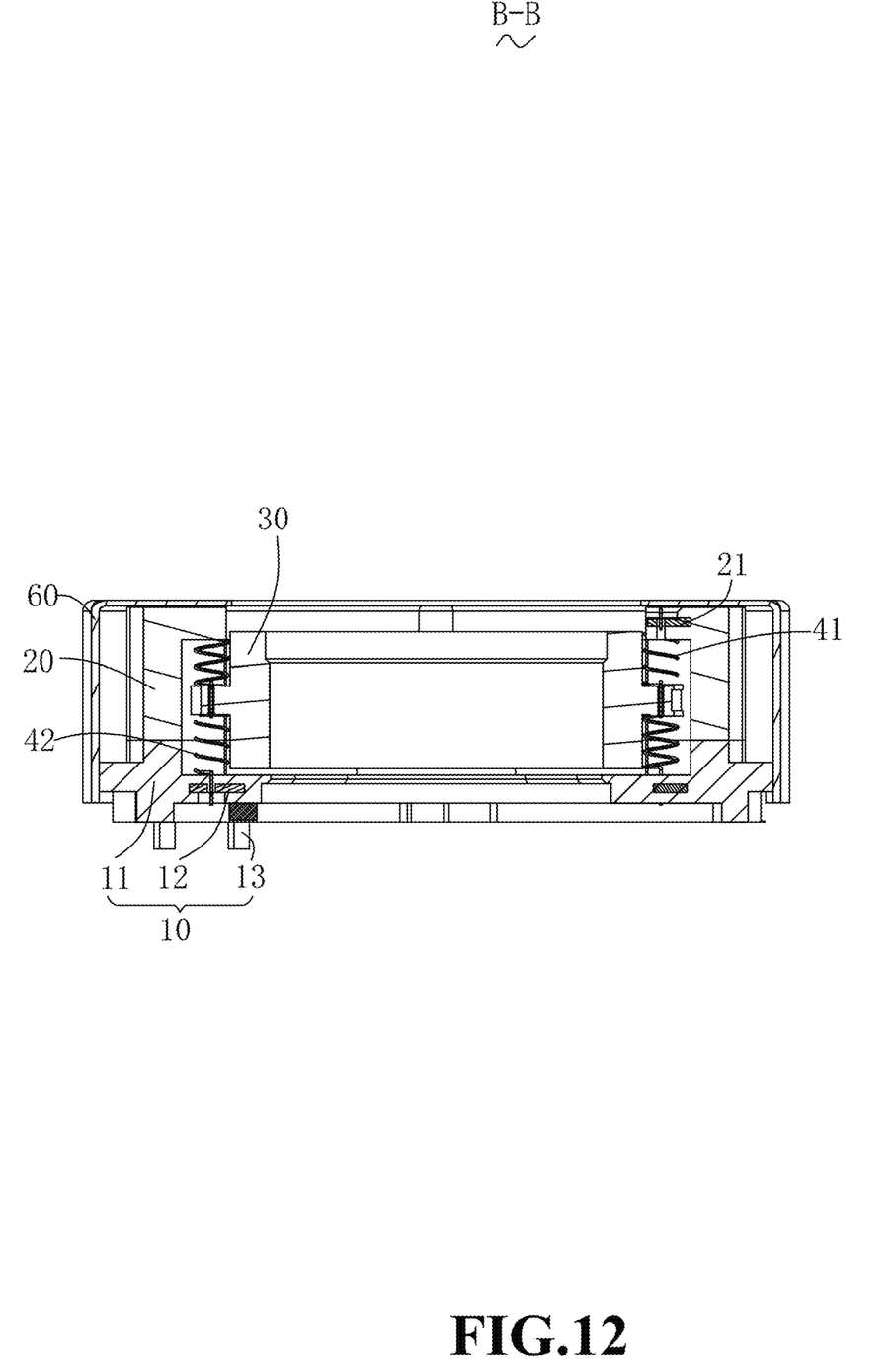
FIG. 12 is a cross-sectional diagram taken along line B-B of FIG. 1.

Referring to FIG. 11 and FIG. 12 in combination, the first elastic member 41 and the second elastic member 42 respectively support the barrel 30 so that the barrel 30 is supported in the air within the accommodating space. The metal sleeve 50 is attached and fixed to an inner wall of the guiding hole 3211.

Specifically, the metal sleeve 50 and the barrel 30 are formed in one piece by means of injection molding, and the metal sleeve 50 completely covers the inner wall of the guiding hole 3211. The guiding pole 14 is installed into the guiding hole 3211 via the metal sleeve 50. The arrangement of the metal sleeve 50 can reduce the resistance subjected by the barrel 30 when it is in contact with the guiding pole 14 during the moving, such that the barrel 30 can move more quickly.

The housing 60 covers the pedestal 11, and the supporting frame 20 is accommodated and fixed within the housing 60.

In the present embodiment, it is not limited to disposing the conductive wire 33 on the outer surface of the barrel 30, and the conductive wire 33 can also be embedded inside of the barrel 30. The guiding pole 14 and the elastic members 40 can also be located on the same barrel extending portion 32.

The working principle of the lens driving apparatus 100 of the present disclosure will be described as follows.

When no current flows into the first conductive terminal 12 and the second conductive terminal 13, the first elastic member 41 and the second elastic member 42 are in a normal state, and the barrel 30 is in its initial position. Then, when the currents flow in the first conductive terminal 12 or the second conductive terminal 13, the barrel 30 can move to a desired position quickly.

When the currents flow into the first conductive terminal 12, the crystal structure of the second elastic member 42 is converted from martensite to austenite, such that the second elastic member 42 contracts to generate a contracting force, which overcomes a pulling force of the first elastic member 41, driving the barrel 30 to move towards the pedestal 11.

Specifically, when the second elastic member 42 contracts to bring the barrel 30 to the maximum position of the negative direction movement, the currents applied to the first conductive terminal 12 decrease or stop, and the second conductive terminal 13 is simultaneously applied with currents. When the currents flow into the second conductive terminal 13, the crystal structure of the first elastic member 41 is converted from martensite to austenite, such that the first elastic member 41 contracts to generate a contracting force, which overcomes a pulling force of the second elastic member 42, driving the barrel 30 to move in a direction away from the pedestal 11 from the maximum position of the negative direction movement to the maximum position of the positive direction movement.

When the first elastic member 41 contracts to bring the barrel 30 to the maximum position of the positive direction movement, the currents applied to the second conductive terminal 13 decrease or stop, and the first conductive terminal 12 is simultaneously applied with currents. The second elastic member 42 contracts to drive the barrel 30 to move towards the pedestal 11 from the positive direction maximum position to the negative direction maximum position.

By applying different combinations of currents to the first conductive terminal 12 and the second conductive terminal 13, the contracting states of the first elastic member 41 and the second elastic member 42 can be controlled, and further, relative position of the barrel 30 and the pedestal 11 can be controlled, such that the barrel 30 can reach any position within its travel. Moreover, with the guiding pole 14, deviation of the barrel 30 when it is moving can be avoided, thereby achieving an Automatic Focusing (AF) function of the lens driving apparatus 100.

Second Embodiment

The lens driving apparatus in the present embodiment is basically the same as that in the first embodiment, and differences will be described as follows.

In the present embodiment, the first elastic member 41 and the second elastic member 42 are both are unidirectional tension springs capable of tensioning under heat, that is, both of the first elastic member 41 and the second elastic member 42 will stretch when being heated.

When currents flow into the first conductive terminal 12, the second elastic member 42 stretches and compresses the first elastic member 41 against the tensile force of the first elastic member 41, thereby driving the barrel 30 to move in a positive direction of the direction of the optical axis.

Specifically, when the second elastic member 42 stretches to bring the barrel 30 to a maximum position of a positive direction movement, the currents applied to the first conductive terminal 12 decrease or stop, and the second conductive terminal 13 is simultaneously applied with currents. When the currents flow into the second conductive terminal 13, the first elastic member 41 stretches and compresses the second elastic member 42 against the tensile force of the second elastic member 42, so as to drive the barrel 30 to move in a negative direction of the direction of the optical axis from a positive direction maximum position to a negative direction maximum position.

When the first elastic member 41 stretches to bring the barrel 30 to a maximum position of a negative direction movement, the currents applied to the second conductive terminal 13 decrease or stop, and the first conductive terminal 12 is simultaneously applied with currents. The second elastic member 42 stretches to drive the barrel 30 to move in the positive direction from the negative direction maximum position from the positive direction maximum position.

By applying different combinations of currents to the first conductive terminal 12 and the second conductive terminal 13, the extending state of the first elastic member 41 and the second elastic member 42 can be controlled, and further, relative position of the barrel 30 and the pedestal 11 can be controlled, such that the barrel 30 can reach any position within its travel. This can achieve an Automatic Focusing (AF) function of the lens driving apparatus 100.

Compared with the related art, in the lens driving apparatus of the present disclosure, movement of the barrel in the direction of the optical axis can be controlled by providing the first elastic member and the second elastic member, and the first elastic member and the second elastic are both made of memory alloys and electrically connected to the second conductive terminal and the first conductive terminal respectively. Moreover, the contracting or extending state of the first elastic member or the second elastic member can be controlled by applying currents to the second conductive terminal or the first conductive terminal, thereby driving the barrel to move in the positive or negative direction of the optical axis. This structure can allow quick bidirectional movement of the barrel, and is simple and easy to assemble. Moreover, the structure is not disturbed by the magnetic field, and thus the stability of the lens driving apparatus can be improved.

The above description is only embodiments of the present disclosure, and it should be noted that those skilled in the art can make improvements without departing from the inventive concept, but these improvements are all within the protection scope of the present disclosure.

What is claimed is:

1. A lens driving apparatus, comprising:
a base, the base comprising a pedestal, and a first conductive terminal and a second conductive terminal disposed on the pedestal and insulated from each other;
a supporting frame, the supporting frame covering and fitting the pedestal and enclosing an accommodating space together with the pedestal, and the supporting frame being provided with a third conductive terminal electrically connected to the second conductive terminal;
a barrel, the barrel being accommodated in the accommodating space and comprising a first conductive wire and a second conductive wire insulated from each other; and
elastic members made of memory alloys, the elastic members being used to support the barrel in air within the accommodating space,
wherein the elastic members comprise:
one or more first elastic members each having one end fixed to the supporting frame and electrically connected to the third conductive terminal and another end fixed to the barrel and electrically connected to the first conductive wire to form a current loop for driving the barrel to move in a positive direction or a negative direction of a direction of an optical axis of the barrel; and
one or more second elastic members each having one end fixed to the base and electrically connected to the first conductive terminal and another end fixed to the barrel and electrically connected to the second conductive wire to form a current loop for driving the barrel to move in the negative direction or the positive direction of the direction of the optical axis.

2. The lens driving apparatus as described in claim 1, wherein the barrel comprises a barrel body portion and one or more barrel extending portions each extending from the barrel body portion in a direction away from the optical axis, each of the one or more first elastic members being fixed to a side of a corresponding one of the one or more barrel extending portions away from the pedestal, and each of the one or more second elastic members being fixed to a side of a corresponding one of the one or more barrel extending portions close to the pedestal.

3. The lens driving apparatus as described in claim 2, wherein the one or more barrel extending portions comprise two first extending portions and two second extending portions, and the one or more first elastic members comprise two first elastic members and the one or more second elastic members comprise two second elastic members, each of the two first elastic members being fixed to a side of one of the two second extending portions away from the pedestal, and each of the two second elastic members being fixed to a side of one of the two second extending portions close to the pedestal.

4. The lens driving apparatus as described in claim 3, wherein the one or more barrel extending portions are distributed on a circumference of the barrel body portion in an annular array, the two first extending portions are symmetrically disposed about the optical axis, and the two second extending portions are symmetrically disposed about the optical axis.

5. The lens driving apparatus as described in claim 2, wherein each of the one or more barrel extending portions is provided with a guiding hole penetrating therethrough in a direction parallel to the optical axis, and the base further comprises a guiding pole fixed on the pedestal, the guiding pole being installed into the guiding hole.

6. The lens driving apparatus as described in claim 5, wherein the guiding pole and the pedestal are fixed together by glue or formed in one piece by means of injection molding.

7. The lens driving apparatus as described in claim 5, wherein the lens driving apparatus further comprises a metal sleeve attached and fixed to an inner wall of the guiding hole, and the guiding pole is installed into the guiding hole via the metal sleeve.

8. The lens driving apparatus as described in claim 7, wherein the metal sleeve and the barrel are formed in one piece by means of injection molding.

9. The lens driving apparatus as described in claim 1, wherein the lens driving apparatus further comprises a housing that covers the pedestal, and the supporting frame is accommodated and fixed within the housing.

10. The lens driving apparatus as described in claim 1, wherein the elastic member are coil springs.

11. The lens driving apparatus as described in claim 10, wherein the elastic members are unidirectional compression springs capable of compressing under heat.

12. The lens driving apparatus as described in claim 10, wherein the elastic members are unidirectional tension springs capable of tensioning under heat.

* * * * *